United States Patent [19]

Silverman et al.

[11] Patent Number: 4,584,480
[45] Date of Patent: Apr. 22, 1986

[54] RADIATION CURING APPARATUS FOR CYLINDRICAL ARTICLES

[75] Inventors: Stanley Silverman, Denville; Joseph Ficon, Franklin Lakes, both of N.J.

[73] Assignee: Sun Chemical Corporation, New York, N.Y.

[21] Appl. No.: 603,612

[22] Filed: Apr. 25, 1984

[51] Int. Cl.⁴ ............................................. G01N 21/00
[52] U.S. Cl. .............................. 250/453.1; 250/504 R
[58] Field of Search .................. 250/453.1, 454.1, 493, 250/494, 495, 504 R, 497, 498

[56] References Cited

U.S. PATENT DOCUMENTS

| | | | |
|---|---|---|---|
| 2,347,672 | 5/1944 | Dircksen et al. | 250/504 R |
| 3,733,709 | 5/1973 | Bassemir et al. | 250/504 R |
| 4,025,795 | 5/1977 | Lackore | 250/504 R |
| 4,048,916 | 9/1977 | Silverman et al. | 250/504 R |
| 4,193,204 | 3/1980 | Nerod | 250/453.1 |
| 4,220,865 | 9/1980 | Silverman | 250/504 R |

FOREIGN PATENT DOCUMENTS 2381261 9/1978 France .

*Primary Examiner*—Bruce C. Anderson
*Attorney, Agent, or Firm*—Cynthia Berlow; Mitchell D. Bittman

[57] ABSTRACT

Apparatus for radiation curing of decorative and protective coatings on the exterior of a can or other tubular article is constructed with a plurality of ultraviolet lamps, each of which is disposed between two runs or flights of a conveyor chain having pins that carry the articles so that each article makes two passes at each lamp to receive radiation therefrom on opposite sides of each article. Two runs of the chain are at right angles to another two runs thereof so that curing radiation impinges on the entire outer surface of the tubular article. Each lamp is disposed within an individual baffle unit including a stationary shield that surrounds a cylindrical shutter that is pivotable about its cylindrical axis between normal and standby positions. In the normal position, diametrically opposed windows of the shutter are aligned with diametrically opposed windows of the shield so that radiation from a single lamp is directed toward two flights of the conveyor chain. In the standby position, radiation opaque portions of the shutter are aligned with the windows of the shield to block radiation from reaching outside the baffle unit.

12 Claims, 4 Drawing Figures

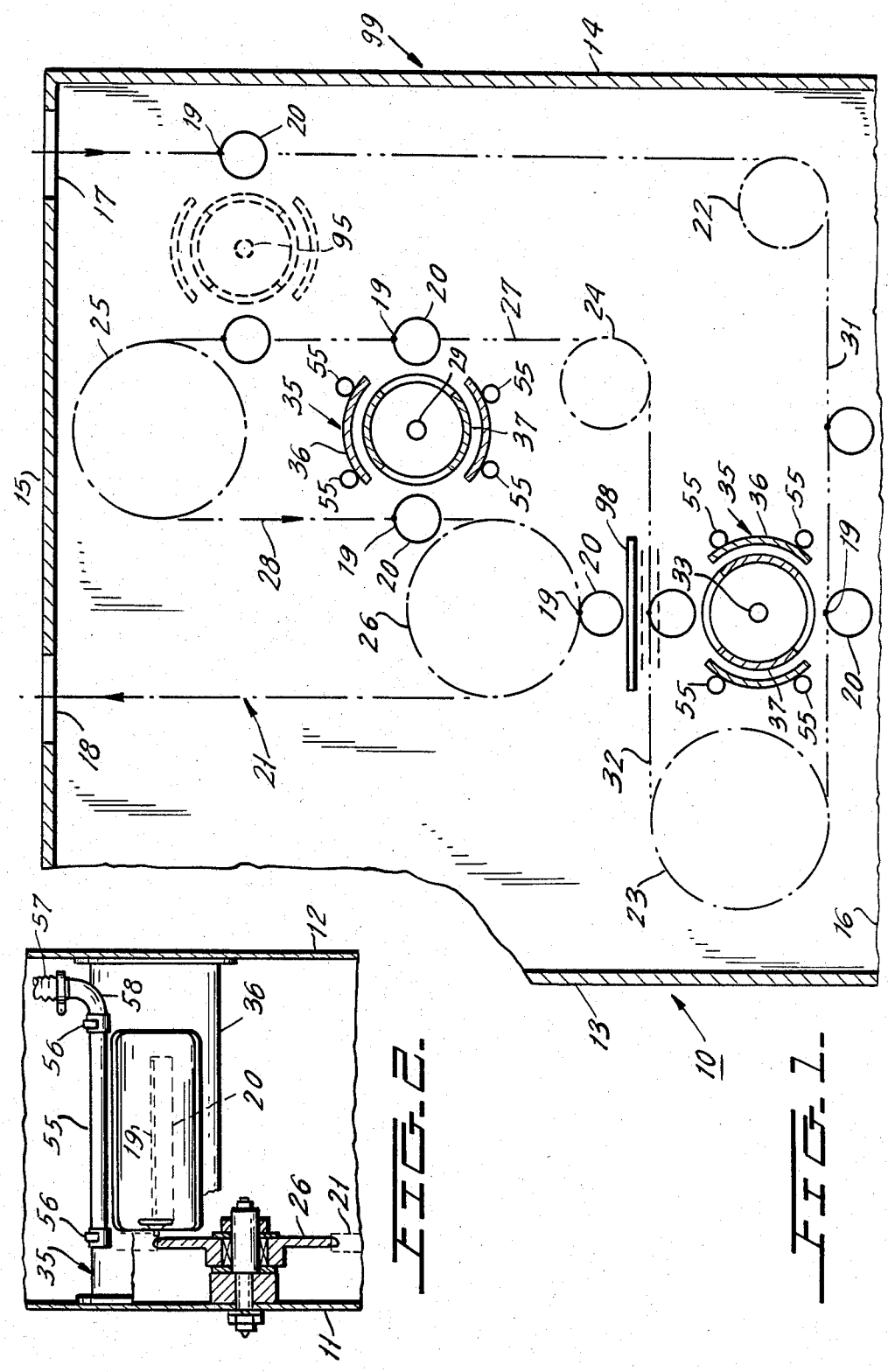

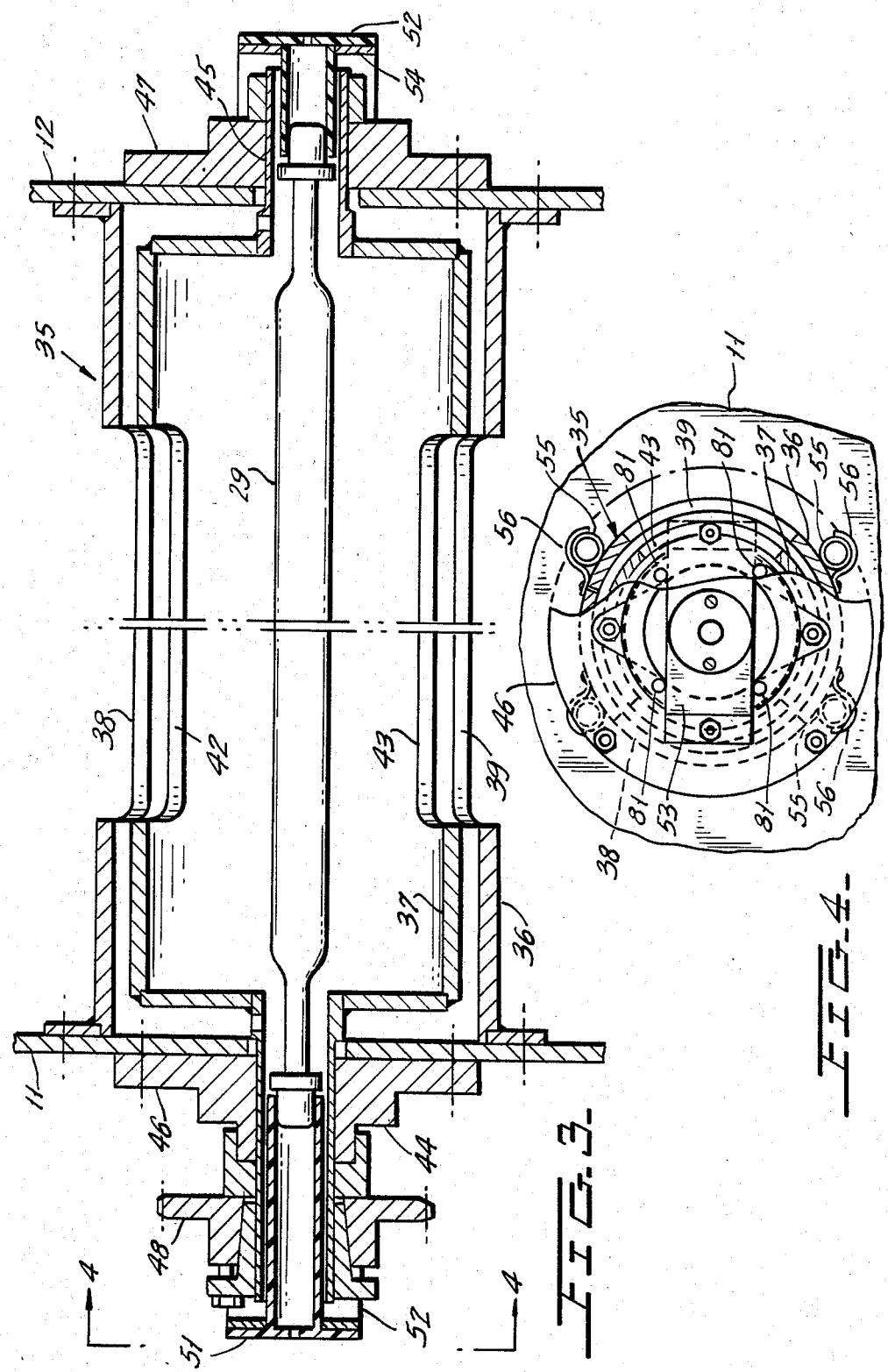

RADIATION CURING APPARATUS FOR CYLINDRICAL ARTICLES

BACKGROUND OF THE INVENTION

This invention relates to ultraviolet curing ovens for curing ultraviolet curable inks on cylindrical objects, and represents an improvement over the apparatus for curing of inks disclosed in the E. J. Whelan U.S. Pat. No. Re. 29,590 issued Mar. 21, 1978 and entitled "Apparatus For Radiation-Curing of Coating on Multi-Sided Object" and the S. Silverman U.S. Pat. No. 4,220,865 issued Sept. 2, 1980 and entitled "Ultraviolet Curing Oven With Rotatable Lamp Assembly".

In curing apparatus of the type disclosed in the aforesaid U.S. Pat. Nos. Re. 29,590 and 4,220,865 cylindrical objects having radiation curable decorations or coatings thereon are rotated as they move past one or more curing lamps in order to subject the entire outer surface of the object to more or less equal amounts of curing radiation. To positively control rotation of the objects, the inner surface thereof was engaged by a plurality of fingers or brush-like elements that were mounted on rotatable pins carried by a conveyor chain that traversed a closed-loop path. With that type of arrangement, it was necessary to provide means for positively rotating the pins and the means for loading and unloading objects on the pins was necessarily more complicated than loading of objects on pins that do not have fingers or brush-like elements that are closely fitted to the interior of the cylindrical object.

Further, the apparatus disclosed in the aforesaid U.S. Pat. Nos. Re. 29,590 and 4,220,865 required reflectors to be associated with the curing lamps in order to focus radiation toward the path traversed by the objects bearing the radiation curable material. The reflectors lost their effectiveness unless cleaned regularly and they had to be cooled in order to prevent warping which would inpair focusing properties thereof.

BRIEF DESCRIPTION OF THE PRESENT INVENTION

In accordance with the instant invention, an improved ultraviolet curing oven is constructed so that the cylindrical objects are carried along a path having at least two sets of parallel sections with one set being at right angles to the other set. A first curing lamp is located between the parallel sections of the first set and another curing lamp is located between the parallel sections of the other set. The tubular objects are supported directly on pins that extend at right angles from a conveyor chain. With this arrangement, energy efficiency is improved in that opposite sides of the tubular article are subjected to radiation from the same lamp and the remaining portions on opposite sides of the article are subjected to radiation from the other lamp, all without providing reflectors or by rotating the pins that carry the tubular articles.

To limit radiation scattering, each lamp is disposed within a baffle unit that includes a stationary shield provided with slits or windows that extend parallel to the axis of the lamp and are disposed on opposite sides thereof so that, for the most part, radiation from the lamp will be directed toward tubular articles passing in close proximity to the baffle unit. The latter also includes a cylindrical shutter that is pivotable about its cylindrical axis between a normal position and a standby position. In the normal position, windows in the shutter are aligned with the window in the shield thereby enabling radiation to impinge on tubular articles passing outside the baffle unit. In the standby position, radiation opaque portions of the shutter are aligned with the windows of the shield so that radiation is confined within the baffle unit. When the shutter is in its standby position, lamp power is automatically reduced to conserve power and limit heating of the baffle unit. Air tubes are mounted on the stationary damper to direct cooling air toward the tubular articles in the region where radiation impinges thereon. This is especially necessary when the articles are constructed of thermoplastic material.

Accordingly, the primary object of the instant invention is to provide a novel, efficient apparatus for radiation curing of decorative and protective coatings on the exterior of a tubular article.

Another object is to provide apparatus of this type that does not require the tubular articles to be rotated during the curing operation.

Still another object is to provide apparatus of this type that does not require reflectors to direct curing radiation toward the tubular articles.

A further object is to provide apparatus of this type having each of its radiation producing lamps disposed within an individual novel baffle unit.

A still further object is to provide apparatus of this type having means to cool the tubular articles.

BRIEF DESCRIPTION OF THE DRAWINGS

The foregoing objects as well as other objects of this invention shall become readily apparent after reading the following description of the accompanying drawings in which:

FIG. 1 is a side elevation in schematic form of a curing oven constructed in accordance with teachings of the instant invention, with the near side of the housing cut away to reveal the internal elements.

FIG. 2 is a side elevation of one of the baffle units and elements associated therewith.

FIG. 3 is a side elevation of one of the radiation-producing lamps and the baffle unit associated therewith.

FIG. 4 is an end view of the elements of FIG. 3 looking in the direction of arrows 4—4.

DETAILED DESCRIPTION OF THE DRAWINGS

Now referring to the figures and more particularly to FIG. 1 wherein the radiation curing apparatus of the instant invention is indicated generally by reference numeral 10 and includes relatively narrow rectangular housing 99 consisting of side walls 11 and 12 (FIG. 3) connected by opposed end walls 13 and 14, top wall 15 and bottom wall 16. Top wall 15 is provided with aperture 17 through which cylindrical cans or other tubular articles 20 enter housing 99, and another aperture 18 through which articles 20 exit housing 99. Cans 20 move through housing 99 while being supported directly on pins 19 that are equally spaced along conveyor chain 21 and extend at right angles to the plane of movement for chain 21. In a manner well known to the art, chain 21 traverses a closed-loop path that extends through entrance 17 and exit 18.

Within housing 99, chain 21 moves in the direction indicated by the arrowheads along the path defined by sprockets 22–26. In particular, the chain path within housing 99 include a first set of parallel sections or vertical runs 27, 28 and a second set of parallel sections or horizontal runs 31, 32. Elongated ultraviolet lamp 29 is disposed in the space between vertical conveyor runs 27, 28 with the axis of lamp 29 being horizontal or generally parallel to the axes of conveyor pins 19. Similarly, another ultraviolet lamp 33 is disposed in the space between horizontal runs 31, 32 with the axis of lamp 33 also being horizontal and generally parallel to the axes of conveyor pins 19.

Lamps 29 and 33 are disposed within individual baffle units 35 each of which includes a stationary cylindrical shield 36 and a cylindrical shutter 37 that is pivotable about its cylindrical axis between a normal or open position and a standby or closed position, for a reason which will hereinafter be seen. Damper 36 extends across the narrow dimension of housing 99 with opposite ends of damper 36 being secured to the respective side walls 11 and 12. Shield 36 is provided with diametrically opposed windows or radiation slots 38, 39 each of which is approximately 90° in width. Cylindrical shutter 37 is disposed inside of shield 36 and is concentric therewith. Diametrically opposed windows or radiation slots 42, 43, each approximately 90° in width, are provided in the cylindrical side wall of shutter 37. Axially aligned with the side wall of shutter 37 and extending outward from the ends thereof are hollow stub shafts 44, 45 that project through and are pivotally supported in the respective bearing blocks 46, 47 that are secured to the outside surfaces of the respective side walls 11, 12.

Keyed to shaft 44 and disposed outboard of bearing block 46 is sprocket 48 that is engaged with a chain (not shown) for simultaneously operating shutters 37 of both baffle units 35 between their normal and standby positions. That is, in a manner well known to the art, when chain 21 is stopped reduced or standby power is automatically applied to lamps 29 and 33. Simultaneously, shutter 37 is pivoted to its standby position where radiation opaque portions of the shutter's side wall are aligned with shield windows 38, 39 so that radiation being emitted by lamps 29, 33 is confined within baffle units 35. When chain 21 starts up, full power is restored to lamps 29 and 33 and shutters 37 are pivoted approximately 90° to align their windows 42, 43 with the respective windows 38, 39 of shields 36 so that radiation emitted by lamp 29 reaches the chain path sections 27, 28 and radiation emitted by lamp 33 reaches chain path sections 31, 32.

The diameter of each stub shaft 44, 45 is greater than the diameter of lamp 29 so that the latter may be withdrawn and replaced through shafts 44, 45. The insulated ends of lamp 29 are held by sockets 51, 52 that are secured to the webs of the respective U-shaped bridges 53, 54 that are in turn secured to the respective side walls 11, 12. The electrical leads (not shown) for energizing lamp 29 extend through sockets 51, 52.

Adjacent to each side of each of the windows 38, 39 is a tube 55 that extends parallel to the axis of lamp 29 and is secured to the outside of damper 36 by clips 56. Each tube 55 is supplied with air under pressure by hose 57 that is connected through elbow 58 to one end of tube 55. Perforations in the side wall of tube 55 are positioned to direct cooling air toward the path traveled by cans 20 in the vicinity of baffle unit 35. These preforations in tube 55 form low velocity air jets that are directed toward the region where maximum radiation impinges upon cans 20.

In operation of apparatus 10, cans 20 enter housing 99 through entrance 17 and while moving to the left along horizontal path section 31 the upper portion of can 20 is subjected to radiation from lamp 33. As this can 20 moves to the right along path section 32, the lower portion of can 20 is also subjected to radiation from lamp 33. Thereafter, can 20 moves upward along vertical path section 27 and the left side of can 20 is subjected to radiation from lamp 29. Finally, the right side of this can 20 is subjected to radiation from lamp 29 as this can 20 moves downward along path section 28. Thereafter can 20 is directed out of housing 99 through exit 18. Flat shield 98 is disposed above horizontal section 32 to block radiation emitted by lamp 33 from reaching exit 18. Other shields, similar to shield 98, may be provided to block radiation from leaving housing 99 through other openings thereof (not shown).

Thus, it is seen that the side wall of each can 20 is subjected to curing radiation emitted by each of the lamps 29 and 33, with the radiation from lamp 29 impinging on opposite sides of can 20 and radiation from lamp 33 impinging on the top and bottom of can 20 while it is supported in a horizontal position by pin 19. In this way the entire outer surface of can 20 is evenly subjected to curing radiation without the necessity of rotating can 20 about the axis of supported pin 19.

If it is desired to circulate additional air to cool lamps 29 and 33, low pressure may be applied outside of walls 11 and 12 in order to draw air across lamps 29 and 33 through apertures 81, 82. There are four equally spaced apertures 82 in each end of shutter 37 aligned with an equal number of apertures 81 in each wall 11, 12.

It should now be apparent to those skilled in the art that one or more additional lamps, such as lamp 95 shown in FIG. 1 and its associated baffle unit and a shield to prevent light spill, may be provided if additional curing is required. Changes in the path of the conveyor chain may be made as required to obtain parallel flights on opposite sides of each baffle unit. Chain 21 may enter and/or leave housing 99 at openings (not shown) in its bottom 16 or ends 13, 14. It should also be apparent to those skilled in the art that while the tubular articles being treated have been described as being cylindrical cans that are closed at one end, the articles may be non-circular in cross-section and/or may be open at both ends. Further, while the conveyor chain has been described as being either horizontal or vertical as it passes the baffle units, the chain may be diagonal in these regions so long as the baffle is oriented to direct radiation toward the chain.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. Apparatus for radiation curing of decorative and protective coatings on the exterior of a tubular article, said apparatus including:
    elongated parallel first and second lamps for generating curing radiation;
    a conveyor and a plurality of support means equally spaced along the length of said conveyor for carrying tubular articles having radiation curable coatings thereon along a predetermined path passing said lamps, said path being arranged to expose the entire surface of said exterior of said articles to said curing radiation without rotating said articles about said support means and without rotating said support means, the longitudinal axes of said lamps being generally parallel to the tubular axes of said tubular articles while radiation from said lamps impinges on said curable coatings for curing thereof;

said path including first and second sections generally parallel to each other, and also including third and fourth sections generally parallel to each other;

said lamps having their longitudinal axes extending transverse to direction of movement for said support means along said path; said longitudinal axis of said first lamp extending between said first and second sections, said longitudinal axis of said second lamp extending between said third and fourth sections;

said first and second sections being transverse to said third and forth sections;

said conveyor including a closed loop chain; a plurality of rotatable sprockets supporting said chain in the vicinity of said lamps, each of said support means including a pin for supporting said tubular article by entering same through one end thereof, contacting the interior surface thereof, and permitting said tubular article to be freely suspended from said pin, said pins extending generally parallel to the axes on which said sprockets rotate.

2. Apparatus as set forth in claim 1 in which said first and second sections are generally horizontal, and said third and fourth sections are generally vertical.

3. Apparatus as set forth in claim 1 also including an individual baffle unit wherein each of said lamps is disposed; each of said baffle units including a stationary shield having windows disposed on opposite sides of the lamp disposed within said baffle unit; said windows being positioned to permit radiation from said first lamp to propagate simultaneously to both said first and second sections and to permit radiation from said second lamp to propagate simultaneously to both said third and fourth sections.

4. Apparatus as set fourth in claim 3 in which each of said baffle units includes shutter means selectively operable between normal and standby positions; with said shutter means in said normal position radiation from said lamps propagating through said windows; said shutter means when in said standby position being aligned with said windows to prevent radiation from said lamps from reaching said first, second, third and fourth sections.

5. Apparatus as set forth in claim 4 in which each of said shutter means includes a tubular member pivotable about its tubular axis between said normal and standby positions; with said tubular member in said normal position, windows thereof being aligned with said windows of said shield; with said tubular member in said standby position, radiation opaque portions thereof being aligned with said windows of said damper.

6. Apparatus as set forth in claim 5 in which the tubular axis of said tubular member and the longitudinal axis of said lamp are coaxial.

7. Apparatus as set forth in claim 3 also including an individual air supply means associated with each of said baffle units for cooling of tubular articles in the vicinity thereof.

8. Apparatus for radiation curing of decorative and protective coatings on the exterior of a tubular, said apparatus including:

elongated parallel first and second lamps for generating curing radiation;

a conveyor and a plurality of support means equally spaced along the length of said conveyor for carrying tubular articles having radiation curable coatings thereon along a predetermined path passing said lamps, said path being arranged to expose the entire surface of said exterior of said articles to said curing radiation without rotating said articles about said support means and without rotating said support means, the longitudinal axes of said lamps being generally parallel to the tubular axes of tubular articles while radiation from said lamps impinges on said curable coatings for curing thereof;

said path including first and second sections generally parallel to each other, and also including third and fourth sections generally parallel to each other;

said lamps having their longitudinal axes extending transverse to direction of movement for said support means along said path; said longitudinal axis of said first lamp extending between said first and second sections, said longitudinal axis of said second lamp extending between said third and fourth sections;

said first and second sections being transverse to said third and fourth sections;

an individual baffle unit wherein each of said lamps is disposed;

each of said baffle units including a stationary shield having windows disposed on opposite sides of the lamp disposed within said baffle unit, said windows being positioned to permit radiation from said first lamp to propagate simultaneously to both said first and second sections and to permit radiation from said second lamp to propagate simultaneously to both said third and fourth sections;

each of said baffle units also including shutter means selectively operable between normal and standby positions, with said shutter means in said normal position radiation from said lamps propagating through said windows, said shutter means when in said standby position being aligned with said windows to prevent radiation from said lamps from reaching said first, second, third and fourth sections.

9. Apparatus as set forth in claim 8 in which each of said shutter means includes a tubular member pivotable about its tubular axis between said normal and standby positions; with said tubular member in said normal position, windows thereof being aligned with said windows of said shield; with said tubular member in said stanby position, radiation opaque portions thereof being aligned with said windows of said damper.

10. Apparatus as set forth in claim 9 in which the tubular axis of said tubular member and the longitudinal axis of said lamp are coaxial.

11. Apparatus as set forth in claim 10 also including an individual air supply means associate with each of said baffle units for cooling of tubular articles in the vicinity thereof.

12. Apparatus for radiation curing of decorative and protective coatings on the exterior of a tubular article, said apparatus including:

elongated parallel first and second lamps for generating curing radiation;

a conveyor and a plurality of support means equally spaced along the length of said conveyor for carrying tubular articles having radiation curable coatings thereon along a predetermined path passing said lamps, said path being arranged to expose the entire surface of said exterior of said articles to said curing radiation without rotating said articles about said support means and without rotating said support means, the longitudinal axes of said lamps being generally parallel to the tubular axes of tubular articles while radiation from said lamp impinges on said curable coatings for curing thereof;

said path including first and second sections generally parallel to each other, and also including third and fourth sections generally parallel to each other;

said lamps having their longitudinal axes extending transverse to direction of movement for said support means along said path; said longitudinal axis of said first lamp extending between said first and second sections, said longitudinal axis of said second lamp extending between said third and fourth sections;

said first and second sections being transverse to said third and fourth sections;

an individual baffle unit wherein each of said lamps is disposed; and an individual air supply means associated with each of said baffle units for cooling of tubular articles in the vicinity thereof.

* * * * *